US010704685B2

(12) United States Patent
Prigent et al.

(10) Patent No.: US 10,704,685 B2
(45) Date of Patent: Jul. 7, 2020

(54) HYDRAULIC-ASSISTANCE SYSTEM FOR OPEN-CIRCUIT MOTOR VEHICLES (71) Applicant: Poclain Hydraulics Industrie, Verberie (FR)

(72) Inventors: Andre Prigent, Verberie (FR); Cyrille D'Hersignerie, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 105 days.

(21) Appl. No.: 15/571,470

(22) PCT Filed: May 4, 2016

(86) PCT No.: PCT/FR2016/000085
§ 371 (c)(1),
(2) Date: Nov. 2, 2017

(87) PCT Pub. No.: WO2016/177944
PCT Pub. Date: Nov. 10, 2016

(65) Prior Publication Data
US 2018/0135749 A1 May 17, 2018

(30) Foreign Application Priority Data
May 5, 2015 (FR) .................................... 15 54012

(51) Int. Cl.
*F16H 61/4148* (2010.01)
*B60K 23/08* (2006.01)
(Continued)

(52) U.S. Cl.
CPC ....... *F16H 61/4148* (2013.01); *B60K 7/0015* (2013.01); *B60K 17/10* (2013.01);
(Continued)

(58) Field of Classification Search
CPC .... F16H 61/4148; F16H 61/431; B60K 17/10
See application file for complete search history.

(56) References Cited

U.S. PATENT DOCUMENTS 3,823,650 A * 7/1974 Ring .................... B60K 7/0015
91/497
3,981,374 A * 9/1976 Johns, Jr. ............... B62D 59/04
180/14.3
(Continued)

FOREIGN PATENT DOCUMENTS

BE 901116 3/1985
EP 0131505 1/1985
(Continued)

OTHER PUBLICATIONS

French Search Report, dated Mar. 16, 2016, French Application No. 1554012.
(Continued)

*Primary Examiner* — F Daniel Lopez
(74) *Attorney, Agent, or Firm* — Womble Bond Dickinson (US) LLP (57) ABSTRACT The present invention relates to a hydraulic-assistance system for motor vehicles, comprising a primary motor (M) and two hydraulic machines (140; 240, 250) connected by a hydraulic circuit such that when a first hydraulic machine (140) operates as a pump, the second hydraulic machine (240, 250) operates as a motor. The invention is characterized in that the hydraulic circuit connecting the two machines (140; 240, 250) is an open circuit passing through a tank (300), the hydraulic machine (240, 250) operating as a motor is a declutchable machine, and the hydraulic machine (140) operating as a pump is a pump in which the variable displacement is controlled by a device comprising a proportional pressure limiter (470) placed between a drain line (143) and the discharge line of the hydraulic machine
(Continued)

(140) operating as a pump, and enabling the assistance pressure to be set, and at least one collection nozzle (460) placed between the proportional pressure limiter (470) and the discharge line of the hydraulic machine (140), the setpoint pressure controlling the hydraulic machine (140) operating as a pump being collected between the pressure limiter (470) and the collection nozzle (460).

14 Claims, 11 Drawing Sheets

(51) Int. Cl.
    *F16H 61/4078*    (2010.01)
    *F16H 61/423*    (2010.01)
    *B60K 7/00*    (2006.01)
    *B60K 17/10*    (2006.01)
    *B60K 17/356*    (2006.01)

(52) U.S. Cl.
    CPC ............ *B60K 17/356* (2013.01); *B60K 23/08* (2013.01); *F16H 61/4078* (2013.01); *F16H 61/423* (2013.01); *B60K 2023/0825* (2013.01)

(56) References Cited

U.S. PATENT DOCUMENTS

| | | | | |
|---|---|---|---|---|
| 4,468,173 | A | * | 8/1984 | Dantlgraber ............ F04B 49/08 417/220 |
| 4,570,741 | A | * | 2/1986 | McCoy ................ B60K 7/0007 180/242 |
| 4,991,672 | A | | 2/1991 | Leino |
| 5,062,265 | A | | 11/1991 | Markunas |
| 5,303,551 | A | * | 4/1994 | Lee ........................ E02F 9/2221 417/34 |
| 5,472,062 | A | * | 12/1995 | Nagai ...................... B60G 3/00 180/252 |
| 6,389,809 | B1 | | 5/2002 | Niidome et al. |
| 2013/0243611 | A1 | * | 9/2013 | Rill ........................ F01P 7/044 417/53 |

FOREIGN PATENT DOCUMENTS

FR    2958886    10/2011
FR    2996176    4/2014

OTHER PUBLICATIONS

International Search Report with English Language Translation, dated Aug. 30, 2016, Application No. PCT/FR2016/000085.

* cited by examiner

FIG 1
State of the art

HYDRAULIC-ASSISTANCE SYSTEM FOR OPEN-CIRCUIT MOTOR VEHICLES

The present invention relates to the field of hydraulic assistance for motor vehicles.

Different types of hydraulic assistance have already been proposed.

Known in particular is hydraulic assistance comprising a heat motor and a variable-displacement pump driven by the heat motor and which feeds at least one hydraulic motor associated with a wheel or an axle, through a closed circuit.

Also known is hydraulic assistance which comprises a fixed-displacement pump mounted on the secondary of a gearbox associated with a heat motor and which feeds at least one hydraulic motor associated with a wheel or an axle, through a closed circuit.

Figure 1:
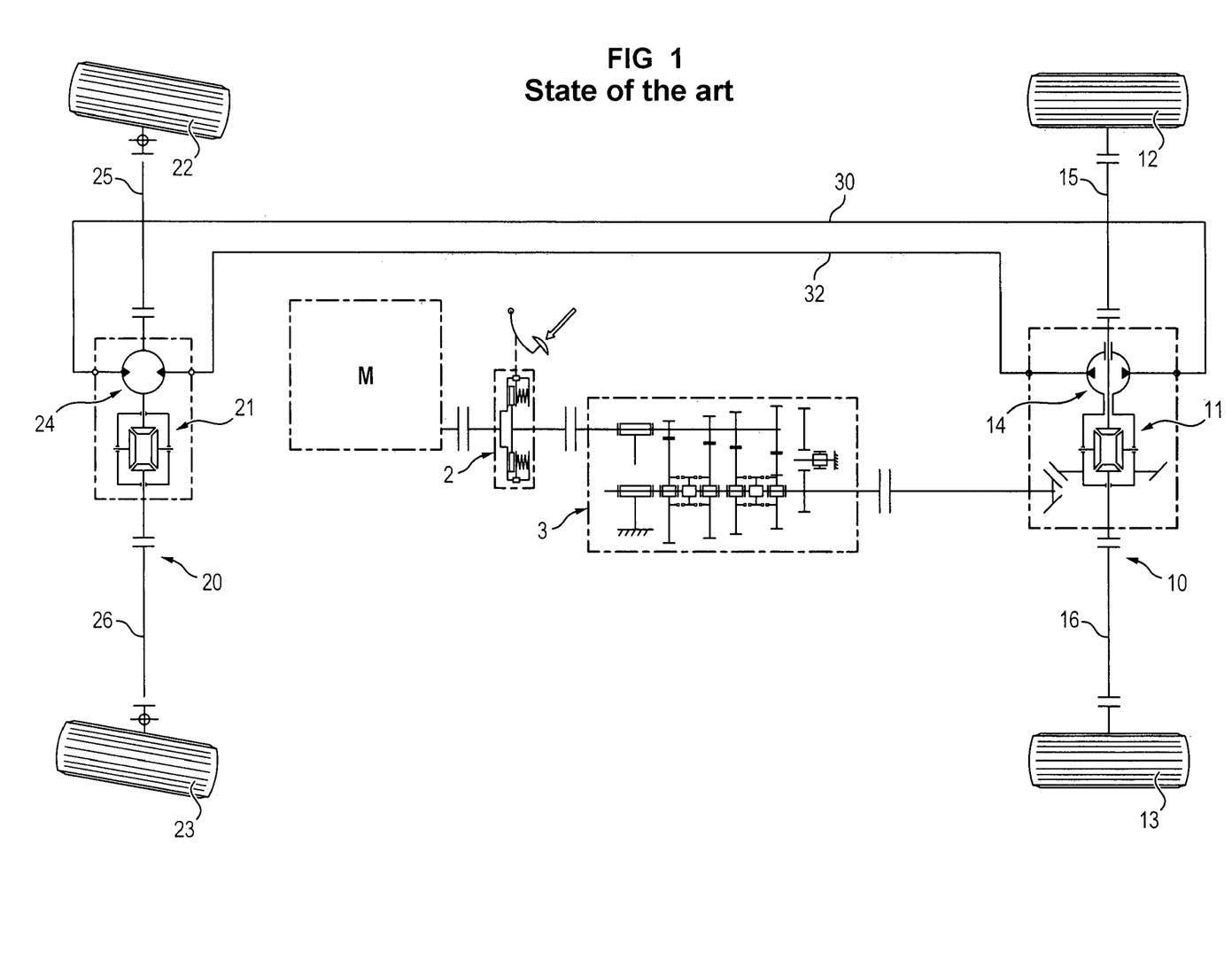
FIG. 1, previously described, shows the assistance circuit of the type conforming to the prior art described in document FR-2996176.

Described for example in document FR 2 996 176 is a hydraulic assistance of the type illustrated in the appended FIG. 1.

Observed in this appended FIG. 1 is a vehicle comprising an axle driving axle 10 connected to a primary heat motor M through a clutch 2 and a gearbox 3. The driving axle 10 is divided by a differential 11 into two half-axles 15 and 16 on which are respectively mounted wheels 12 and 13. A driven axle 20 is also divided into two half-axles 25, 26 an which are respectively mounted wheels 22 and 23, by a differential 21. Each of the axles 10, 20 is equipped with a hydraulic device 14, 24. The two hydraulic devices 14, 24 are connected by hydraulic lines 30, 32 so that when the hydraulic device 14 operates as a pump and generates a flow rate, it feeds the second hydraulic device 24 which then operates as a motor, and conversely.

To this end, the backflow of the first machine 14 is connected to the intake of the second machine 24 through the line 30, called the high-pressure line, and the discharge of the second machine 24 is connected to the intake of the first machine 14 through the line 32, called the low-pressure line.

Assistance of the aforementioned type turn out to be promising. They do, however, have different constraints.

For example, a booster pump is required to have the pump operate in a closed circuit. Moreover, to start and respectively deactivate the motors, it is necessary to "open" temporarily the closed circuit: a valve having this function is therefore absolutely required.

Known in this connection is document BE 901 116 A1, which discloses a hydraulic assistance system for a motor vehicle, comprising a primary motor connected to a pump, itself connected, through an open circuit, to a motor equipped with a declutching system. The pump described is characterized in that in that it adapts its output flow rate so as to constantly maintain a constant pressure in the circuit. This pressure, determined by the operator, is maintained thanks to a pressure limiter which ensures the safety of the circuit. This allows any booster pump to be eliminated, as well as the need to open the connection circuit to declutch, because the circuit is always open. However, such a system turns out to be inflexible and limited in the spectrum of pressures swept.

The present invention has as its aim to propose new means of assistance allowing better control of the pressure in the circuit and a large range of torque allowed on the motor.

This aim is achieved in the scope of the present invention thanks to a hydraulic assistance system for a motor vehicle, comprising a primary motor and two hydraulic machines connected by a hydraulic circuit in such a manner that when a first hydraulic machine operates as a pump, the second hydraulic machine operates as a motor, characterized in that the hydraulic circuit connecting the two machines is an open circuit running through a reservoir, the hydraulic machine forming a motor is a declutchable machine, and the hydraulic machine operating as a pump is a variable displacement pump, the variable displacement whereof is controlled in pressure by means of a device comprising a proportional calibration pressure limiter, placed between a drain line and the discharge line of the hydraulic machine operating as a pump, and allowing the calibration of the assistance pressure, and at least one collection restriction interposed between the proportional calibration pressure limiter and the discharge line of the hydraulic machine, the set pressure ensuring the control of the hydraulic machine which operates as a pump being collected between the pressure limiter and the collection restriction.

As will be understood when examining what follows, the pressure in the circuit is constantly controlled via a closed-loop feedback circuit, for control of the displacement of the pump. It is the very branching of this servo-control circuit, within the overall circuit, which allows the flexibility and the range of pressures allowed by the invention described in this application.

According to other advantageous features of the invention:
the system comprises:
two opposing actuators which act on an oscillating cam plate to regulate the inclination of the plate and, in so doing, the travel of the pumping pistons, one of the actuators being fed by the pressure at the outlet of the pump, and
a control module which feeds the other actuator, according to the value of the set pressure collected between the pressure limiter and the collection restriction, based on a reservoir pressure for increasing the displacement or based on the outlet pressure of the pump to reduce the displacement, so as to maintain an outlet pressure of the pump equal to the setting.
the control module comprises a distributor forming a zero-displacement spool suitable for alternately applying the reservoir pressure to said other actuator when the set pressure is not attained (that is when the outlet pressure of the pump is less than the set pressure) and the outlet pressure of the pump when the set pressure is exceeded (that is when the outlet pressure of the pump is greater than the set pressure).
the control module comprises a distributor forming a pressure limiter, calibrated by the pressure at the outlet of the pump on one side and by an opposing spring on the other side and suitable for applying the outlet pressure of the pump on said other actuator, when the outlet pressure of the pump exceeds a maximum value, so as to reduce the displacement of the pump.

Other features, aims and advantages of the present invention will appear upon reading the detailed description which follows, and with reference to the appended drawings given by way of non-limiting examples wherein:

FIG. 4 shows the schematic of the control circuit of the variable displacement pump conforming to the present invention, more precisely

Figure 2:
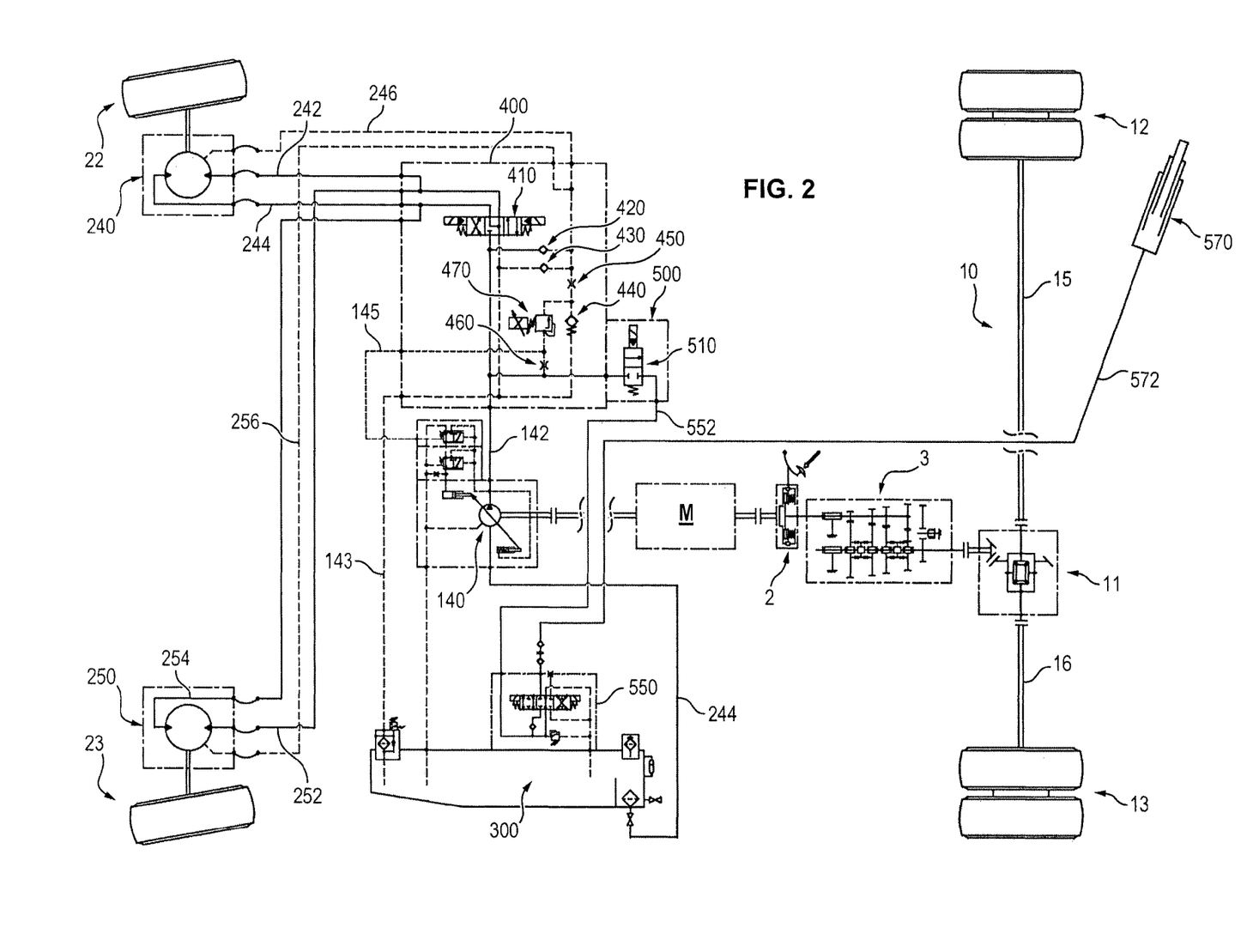
FIG. 2 shows the schematic of a hydraulic system conforming to the present invention.

Found again in the appended FIG. 2 and the following is an assistance system comprising a driving axle 10 connected to a heat motor M through a clutch 2 and a gearbox 3. The driving axle 10 is divided by a differential 11 into two half-axles 15 and 16 on which are respectively mounted wheels 12 and 13, for example, but without limitation, twin wheels.

Driven wheels 22, 23 are provided with assistance conforming to the invention. The driven wheels 22, 23 may be carried by a common axle separated into two half-axles by a differential as illustrated in FIG. 1.

Preferably, however, as illustrated in the appended FIG. 2 and the following, the driven wheels 22 and 23 are separated and associated with respective assistance motors 240, 250. A main hydraulic machine 140 which operates as a pump in the normal assistance operating mode is driven by a power take-off of the heat motor M.

The two hydraulic motors 240 and 250 are mounted in parallel. The two hydraulic motors 240, 250 each have an intake line 242, 252 and a discharge line 244, 254.

The main hydraulic machine 140 forming a pump comprises a discharge line 142 designed to be connected to the intake lines 242, 252 of the motors 240, 250 and an intake line 144 which collects oil in a reservoir 300.

The main pump 140 is preferably a variable displacement pump the displacement whereof is servo-controlled in pressure. Thus, the displacement of the main pump 140 is controlled with respect to a set pressure. If the pressure of the circuit is less than the setting, the displacement of the pump 140 increases and reciprocally. The main pump 140 drawing all its flow in the oil reserve 300 with no pressure, the feed circuit of the motors 240, 250 is an open circuit, with no low-pressure line, with a direct return to the reservoir 300.

The assistance circuit illustrated in FIG. 2 and the following also comprises a block 400 forming the assistance function which allows in particular a neutral bypass position and a flow reversal condition for the reverse driving mode. As indicated previously, according to the invention, the motors 240, 250 are of the clutching/declutching type with piston retraction by pressure and/or by springs. Concretely, according to certain options conforming to the present invention, the pressure in the casing is eliminated and only the springs are retained.

In the appended figures, the dotted lines which go toward the casing enclosures of the motors 240, 250 show drains connected to the reservoir 300. These drains with reference symbols 246, 256 are suitable for recovering internal leaks of the motors 240, 250 and returning them to the oil reservoir 300. Within the scope of the invention, they may be put under pressure to force the pistons of the motors 240, 250 to separate from their respective cam if there is no feed or exhaust pressure. If necessary, the motors 240, 250 may also have return springs to hold the pistons in the retracted position.

Within the scope of the invention, it is possible to combine pressure in the casings of the motors 240 and 250 and a return spring to ensure the declutching of the motors 240 and 250.

In the standby position, the casings of the motors 240, 250 are pressurized with a minimum pressure, which allow the disengagement of the motors to be guaranteed. It is possible, for example, to apply an initial pressure to be certain to fill the casing in a short period on the order of a second, then eliminate this pressure and count only on the springs to hold the pistons in the declutched position as long as the clutching of the motors 240, 250 is not required by the control pressure originating from the pump 140.

Also observed in the appended FIG. 2 and the following is an isolation valve 500 of a dump circuit associated with a lifting valve 550 suitable for control of a single-acting actuator 570.

The structure of the assistance valve 400 shown in the appended FIG. 3 will now be described in more detail.

The assistance valve 400 comprises mainly a four-way, three position distributor 410, suitable for allowing the selection of a forward drive direction, a reverse drive direction and a freewheel position.

A first inlet 412 of the distributor 410 is connected to the discharge line 142 of the main pump 140.

A second inlet 414 of the distributor 410 is connected to a drain line 143 leading to the reservoir 300.

A first outlet 416 of the distributor 410 leads to the intake 242, 252 of the motors 240, 250.

A second outlet 418 of the distributor 410 leads to the discharge lines 244, 254 of the motors 240, 250.

In the neutral position as illustrated in FIG. 2, the first inlet 412 of the distributor 410 connected to the discharge line 142 of the pump 140 is isolated while the two outlets 416 and 418 of the distributor 410 are connected to the second inlet 414 and consequently to the drain line 143.

Figure 6:
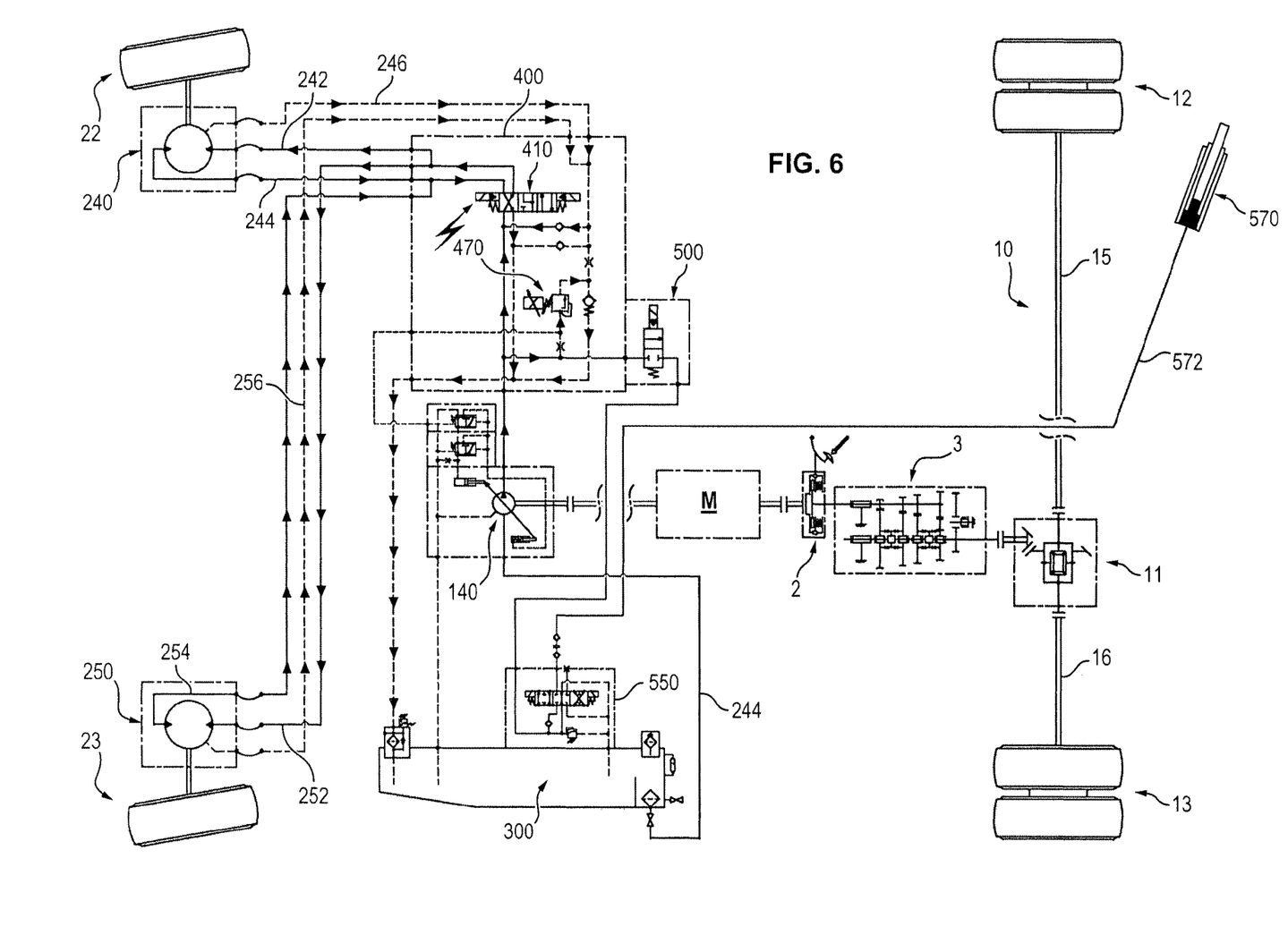
FIG. 6 shows the configuration of a system conforming to the present invention in a front motor clutching phase.

In the forward drive position as illustrated in FIG. 6, the first inlet 412 of the distributor 410, connected to the discharge line 142 of the main pump 140, is connected to the first outlet 416 and consequently to the intake lines 242, 252 of the pumps 240, 250, while the second inlet 414 is connected to the second outlet 418 and consequently to the discharge lines 244, 254 to lead them to the reservoir 300 through the drain 143.

Conversely, in the reverse drive position of the distributor 410, the first inlet 412 is connected to the second outlet 418 and consequently to the lines previously called the discharge lines 244, 254 of the motors 240, 250, to impose their rotation in reverse of the forward drive direction, while the second inlet 414 of the distributor 410 is connected to the first outlet 410 so as to direct the lines 242, 252 previously designated motor 240, 250 feed lines toward the reservoir 300 through the drain 143.

A check valve 420 is mounted between the discharge line 142 of the main pump 140 and the drain lines 246, 256 leading to the motors 240, 250. The check valve 420 is mounted so as to pass in the direction drains 246, 256 toward the discharge line 142 of the main pump 140. The valve 420 allows limiting the casing pressure of the motors 240, 250 to the standby pressure during the retraction of the pistons.

The second check valve 430 is mounted between the drain line 143 leading to the second inlet 414 of the distributor 410 and the drain line 246, 256 leading to the casing of the motors 240, 250. The check valve 430 is mounted passing in the direction from the drain line 143 toward the drain lines 246, 256. The valve 430 allows the casing of the motors 240, 250 to be fed again during declutching.

A branch connecting the drain 143 leading to the reservoir 300 and the drains 246, 256 leading to the motors 240, 250 comprises in series a pressurizing valve 440 and a restriction 450. The pressurization valve 440 is placed on the drain side 143 leading to the reservoir 300, while the restriction 450 is placed on the drain 246, 256 side.

The pressurization valve 440 is passing in the direction from the drains 246, 256 toward the drain 143. This pressurization valve is calibrated and suitable for controlling the pressurization of the casing in the freewheel mode.

The restriction 450 interposed between the pressurization valve 440 and the drain lines 246, 256 leading to the motor 240, 250 is suitable for allowing a pressure increase in the casing of the motors 240, 250 during the retraction of the pistons, while slowing the flow of oil.

Figure 3:
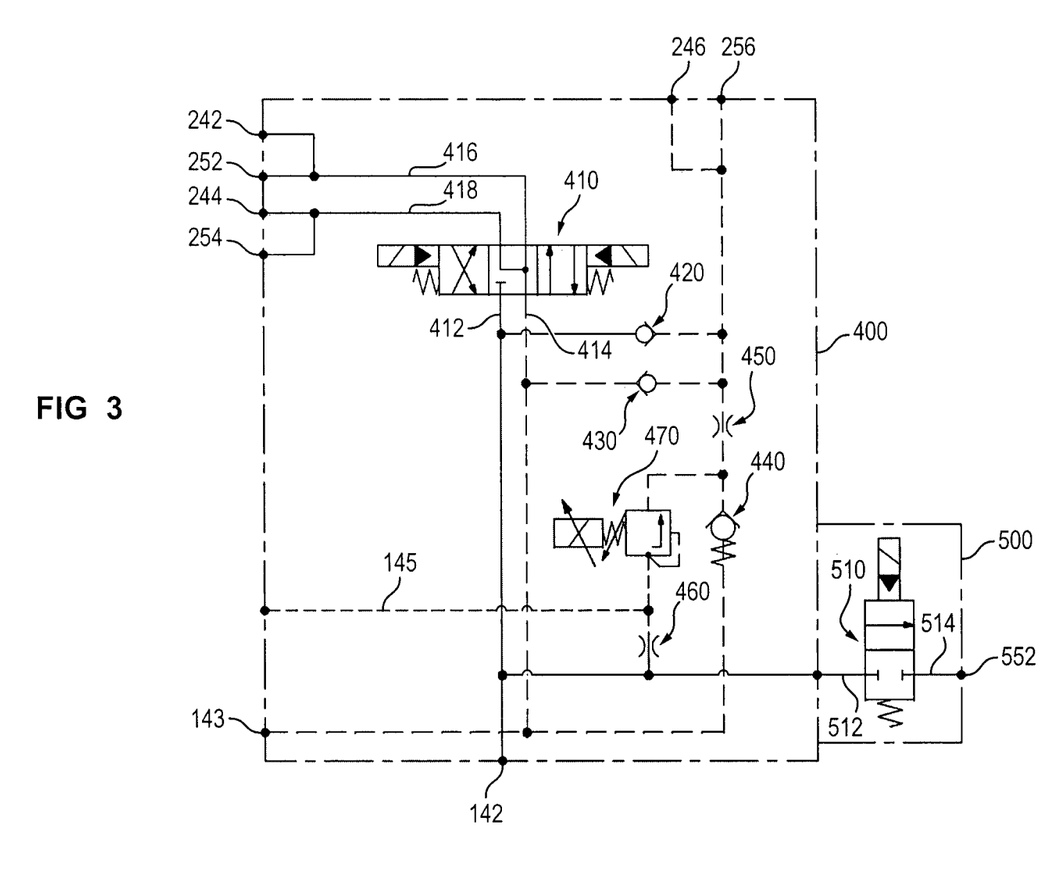
FIG. 3 shows the schematic of an assistance valve conforming to the present invention.

The assistance valve 400 shown in FIG. 3 also comprises a branch mounted in shunt between the discharge line 142 of the main pump 140 and the point common to the pressurization valve 440 and the restriction 450.

This shunt branch comprises in series a restriction 460 and a pressure limiter 470.

The restriction 460 is placed on the discharge line 142 side of the main pump. The collection restriction 460 is suitable for allowing the flow consumed by the control circuit of the assistance to be limited.

The pressure limiter 470 is placed on the drain lines 246, 256 side. The pressure limiter 470 is suitable for limiting the pressure to a proportional calibration allowing the adjustment of the assistance pressure.

The midpoint of this shunt branch common to the pressure limiter 470 and a restriction 460 leads to a pressure setting line 145 which provides for the control of the main pump 140.

Figure 4A:
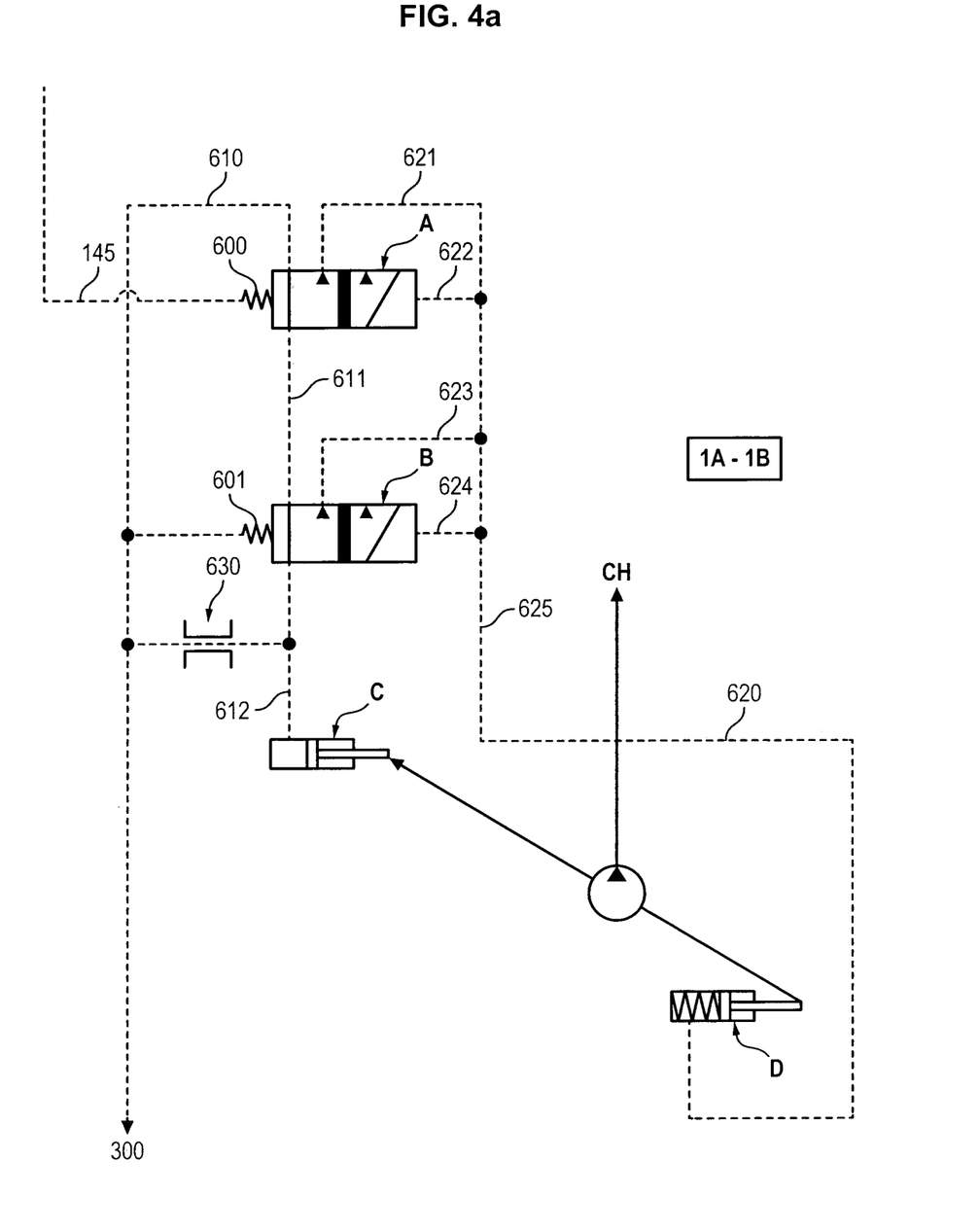
FIG. 4a shows this control circuit in a first state.
Figure 4B:
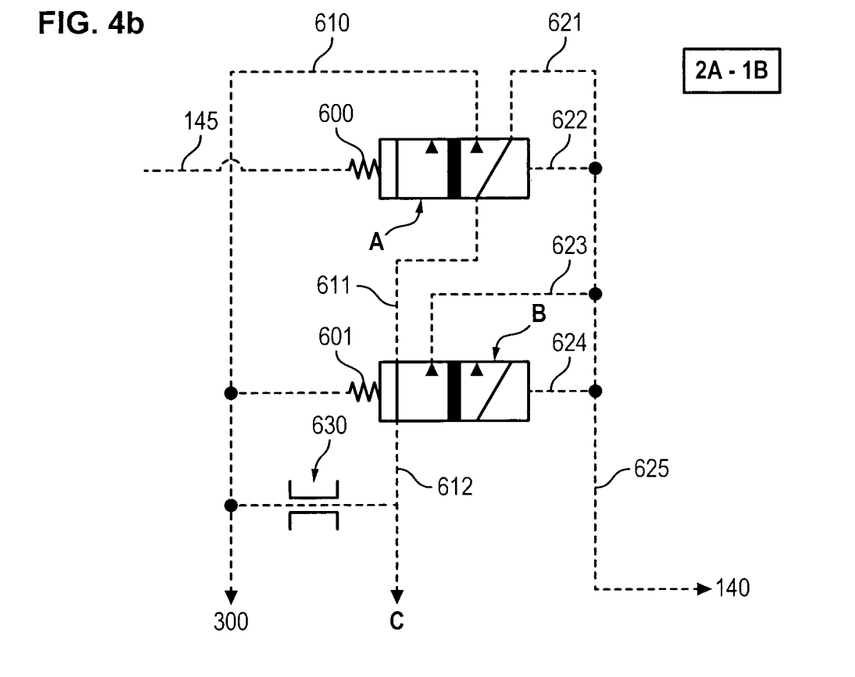
FIG. 4b shows the same control circuit in a second state and FIG. 4c shows this control circuit in a third state.
Figure 4C:
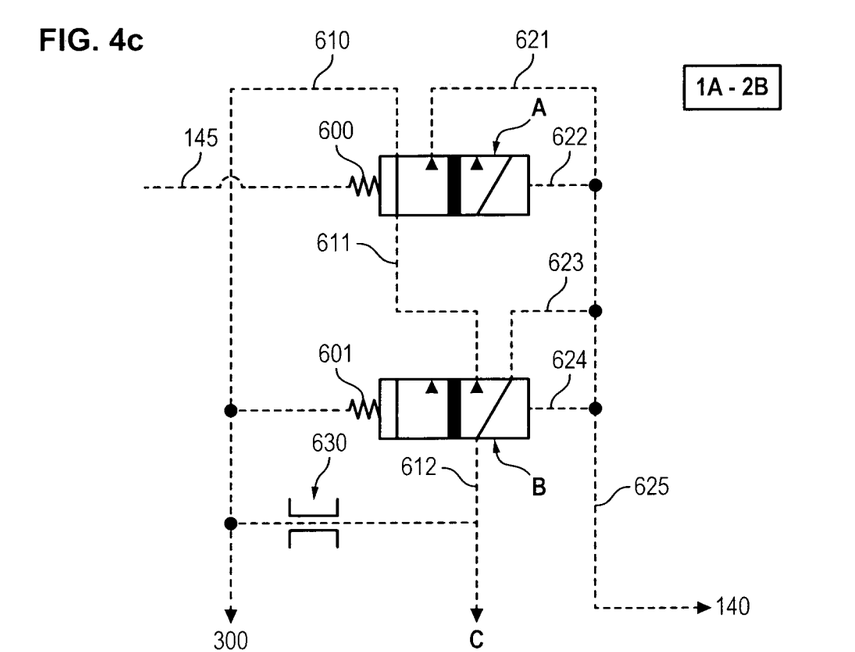

The pressure servo-control allowing control of the main pump 140 shown in the appended FIG. 4 will now be described in more detail.

The displacement of the pump 140 is controlled by the action of the actuators or servo-pistons C and D, which act in a manner known in se on an oscillating cam plate to control the inclination of the plate and thereby the travel of the pumping pistons. A displacement setting spring 602 is placed at the actuator D, in a pressure chamber of this actuator D, to place the pump in a full displacement position in the absence of pressure in the actuators. This position is the starting position of the pump during starting. Upon starting, the pump therefore discharges and pressures are established, which allows the control system of the pump to begin functioning. The thrust of this spring 602 is then incorporated into the total thrust of the actuator D in the description hereafter. The actuator D is fed by the pressure at the outlet of the pump 140 via the line 620. The opposing actuator C is fed by the distributors A and B via a line 612. A and b are three-way (two inlet ways and one outlet way), two position distributors. A and B connect the actuator C, called the displacement setting actuator, either to the outlet pressure of the pump 140 or to the line 610, called the zero-pressure line, connected to the reservoir 300. The displacement of the pump therefore depends on the balance of the pressure which feeds actuators C and D.

The actuators C and D are dimensioned so that, in case of equality of pressure applied to these two actuators, the actuator C exerts a greater force than the actuator D and reduces the displacement of the pump. As long as the feed pressure of D is substantially greater than the feed pressure of C, the displacement of the pump will increase, and with it the pressure at the outlet of the pump.

The distributor A has a first inlet connected to the line 610 connected to the reservoir 300 and a second inlet connected to the line 621 connected to the outlet of the pump 140. Its outlet is connected to a first inlet of the distributor B.

The distributor B has a second inlet connected to the line 623 connected to the outlet of the pump 140. Its outlet is connected to the actuator C via the line 612.

The position of A is controlled on one side by the outlet pressure of the pump via the line 625, then 622 and on the other by a calibration spring 600 and the setting line 145. As long as the action of the spring 600, combined with the pressure delivered by the line 145, is greater than the action of the pressure delivered by the line 622, the distributor A connects the line 610 to the line 611 which constitutes one of the inlet paths of B (position 1A). As soon as the pressure delivered by the line 622 (i.e. the pressure at the outlet of the pump 140) becomes greater than the action of the spring 600 and of the pressure delivered by the line 145, the distributor A switches into its second position and connects the line 611 to the line 621 connected, via 625, to the pressure at the outlet of the pump 140 (position 2A). The distributor A regulates the displacement of the pump according to the pressure in the line 145, the distributor A floating between states 1A and 2A, that is in floating equilibrium between the pressure of the line 145 and the line 622.

The position of B is controlled on one side by the outlet pressure of the pump via the line 625, then 624, and on the other by a calibration spring 601. As long as the action of the spring 601 is greater than the action of the pressure delivered by the line 624, the distributor B connects the line 611 to the line 612 which controls the action of the actuator C (position 1B). As soon as the pressure delivered by the line 624 (i.e. the pressure at the outlet of the pump 140) becomes greater than the action of the spring 601, the distributor B switches into its second position and connects the line 612 to the line 623 connected, via 625, to the pressure at the outlet of the pump 140 (position 2B). The distributor B limits the displacement of the pump so as not to exceed a maximum pressure determined by the spring 601. This is safe equipment.

When A is in position 1A, and B in position 1B, the actuator C is feed at the pressure of the reservoir 300. When A is in position 2A and B in position 1B, the actuator C is fed at the outlet pressure of the pump 140. When A is in position 1A and B in position 2B, the actuator C is fed at the outlet pressure of the pump 140. As will be understood, the 2A-2B case is practically impossible to attain during normal operation of the equipment.

The distributor A is a zero-displacement spool.

During the initial operation of the pump (starting), the device is in the state 1A-1B, and the displacement of the pump is set by the displacement setting spring 602 incorporated at the actuator D. The actuator C receives the pressure of the line 610 via the two spools A and B. In fact, the pressure in the line 145 is zero (470 open), and the calibration spring 600 is used to put the distributor A in the default position which corresponds to the displacement setting to its minimum operating pressure, typically around 20 bars. As soon as this pressure is attained, the device flips into the state 2A-1B. The actuator D receives directly the outlet pressure of the pump via the line 620. The actuator C then receives the outlet pressure of the pump 140, via the two spools A and B. The distributor A is floating, as previously indicated, and the pump is regulated to a constant pressure. To obtain another pressure it is sufficient to vary the calibration value of the limiter 470 to add to the initial calibration of the spring 600. An intermediate pressure is thus created between the pressure upstream of 460 and downstream of 470. This excess pressure is transmitted, via the line 145, to the distributor A which flips into position 1A, thus connecting C to the reservoir 300 pressure, and consequently allowing an increase of the displacement of the pump 140 until the pressure at its outlet is sufficient to counterbalance the excess pressure induced by 145. A flips back into position 2A. The pump is held at the desired set pressure, the distributor A floating between the states 1A and 2A, that is in floating equilibrium between the pressure of the line 145 and the line 622.

The spool A therefore controls the pump 140 for a pressure defined by the spring 600, typically 20 bars, if the pressure in the line 145 is zero (470 open), and for a pressure equal to 20 bars plus the pressure which is established downstream of the restriction 460, if the valve 470 is closed.

Between the restriction 460 fed by the pressure of the pump upstream, and the valve 470 which may discharge fluid toward the zero-pressure oil reservoir 300, a "restriction bridge" is created, that is an intermediate pressure between the pressure upstream of the restriction 460 and the pressure downstream of the valve 470 will be established.

Therefore, the spool A is pushed by a spring 600 of 20 bars. When the pressure at the outlet of the pump 140 attains 20 bars, the spool A is put into equilibrium and the pump 140 fluctuates around the position attained.

If an intermediate pressure connected between the restriction 460 and the valve 470 is added, the equilibrium is broken and the spool A is forced into position 1A to increase the displacement of the pump 140. Equilibrium is attained when the pressure of the pump 140 reaches the intermediate pressure collected between the restriction 460 and the valve 470, plus the calibration force of the spring 600, or typically 20 bars.

Conversely, if the intermediate pressure collected between the restriction 460 and the valve 470 is reduced by action on the valve 470, the equilibrium is also broken and the spool A is forced into the position 2A to reduce the displacement of the pump 140. Equilibrium is again attained when the pressure of the pump 140 reaches the new pressure in the line 145, the distributor A floating between the states 1A and 2A, that is in floating equilibrium between the pressure of the line 145 and the line 622.

The reduction in displacement is therefore obtained if the pressure at the outlet of the pump is greater than the set pressure given by the line 145, due to the fact that the drawer A will displace in the direction causing an increase in the pressure in the actuator C. If the pressure in the line 145 drops to zero, the valve A will remain in equilibrium to regulate around a pressure of 20 bars.

The distributor B is also a zero-displacement spool. It acts as a pressure limiter. It is calibrated by the outlet pressure of the pump 140 on one side and by the opposing spring 601 on the other side. It causes the displacement of the pump 140 to be reduced if this pressure reaches a limiting value, for example 350 bars. In fact, the spring 601 is calibrated so that when the outlet pressure of the pump 140 exceeds a maximum value, typically 350 bars, B switches into position 2B, thus putting into communication the line 612 and the line 623, and thereby the outlet pressure of the pump 140, via the line 625. The actuator C is then fed by the pressure at the outlet of the pump 140, equal to the feed pressure of the actuator D, which drives the reduction of displacement of the pump 140.

Thus, by varying the value of the restriction 470, it is possible to change the pressure in the line 145, and thus to modify the control toward a new set pressure value. The pump 140, essentially through a spool A, and actuators C and D, will autopilot its displacement, regardless of the flow rate consumed, to constantly attain the pressure corresponding to the pressure of the line 145, to which is added the minimum displacement setting pressure defined by the spring 600, typically 20 bars.

Controlling the valve 470 therefore acts, via the control of the displacement of the pump, on the set pressure on which the pump 140 is regulated.

The circuit pressure is proportional to the torque delivered by the hydraulic motors 240 and 250. It is thus possible to control the torque by controlling the pressure in the circuit thanks to the element 470.

It is noted that 470 may have proportional calibration, as previously described, so as to obtain any desired outlet pressure of the pump, but may also be only a two-state valve. For example, 470 may be an electrically-controlled proportional valve, normally open if it is desired to neutralize the assistance in the event of an electrical failure, or normally closed if it is desired to have maximum assistance in the event of an electrical failure.

Also observed in the appended FIG. 4 is a restriction 630 placed between the line 612 connecting the distributor B to the actuator C and the line 610 which communicates with the reservoir 300. In a manner known per se, this restriction 630 creates a leakage line toward the reservoir which is used for damping during commutation of the control of the actuator C, and avoids fluctuations caused by the commutations of the spools A and B.

Observed finally in FIG. 3 is the isolation valve 500 of a lifting circuit. This valve 500 comprises a two-way, two position distributor 510. The inlet 512 of the distributor 510 is connected to the discharge line 142 of the main pump 140. The outlet 514 of the distributor 510 is connected to a feed line 552 with a lifting valve 550.

In the rest position, the outlet 552 is isolated from the inlet 512.

In the working position, the outlet 552 is connected to the inlet 512.

Figure 5:
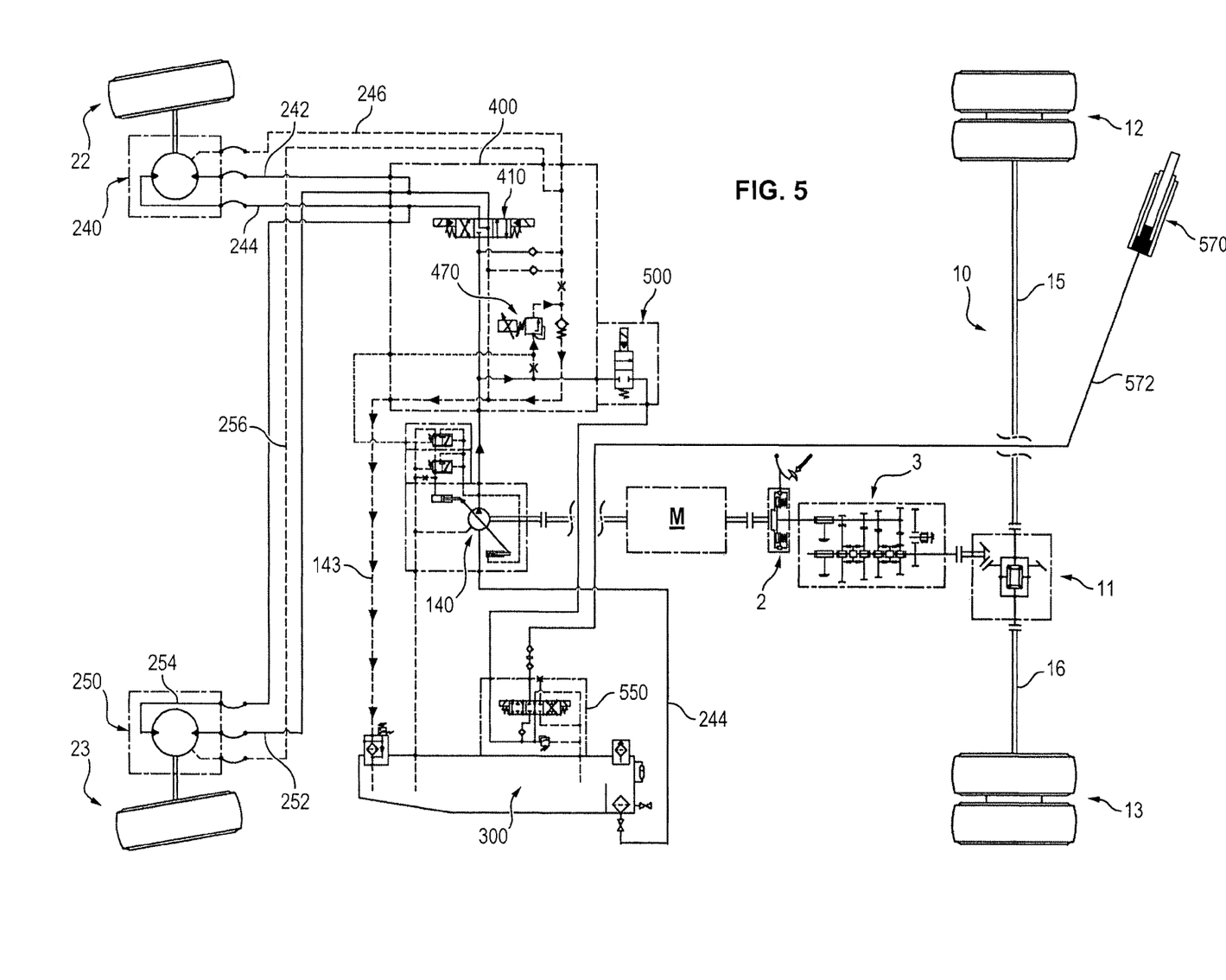
FIG. 5 shows the configuration of the system conforming to the present invention in the forward freewheel mode using only mechanical transmission.

In the freewheel mode as illustrated in FIG. 5, the feed lines 242, 252 of the motors 240, 250 are connected with the reservoir 300 by the distributor 410. The main pump 140 is on standby at a pressure value independent of the calibration of the spring of the compensator 470.

A flow rate is collected by the restriction 460 to as to ensure the pressurization of the casing, the pressure level of the casing being limited to the calibrated value of the protection valve 440.

When assistance is required, to ensure the clutching of the motors 240, 250, the distributor 410 is controlled as illustrated in FIG. 6 so as to select the forward drive mode.

The feed lines 242, 252 of the motors 240, 250 are then connected to the discharge line 142 of the main pump, while the discharge lines 244, 254 of the motors are connected to the drain line 143 which leads to the reservoir 300.

The pistons connected to the feed line 242, 252 are therefore retracted from the cylinder blocks. The casing pressure is limited to the set value of the main pump 140 during the retraction of the pistons, then returns to its pressure level defined by the protection valve 440.

The system does not supply torque and the pump 140 is on standby at the calibration value of the spring of the compensator 470.

Figure 7:
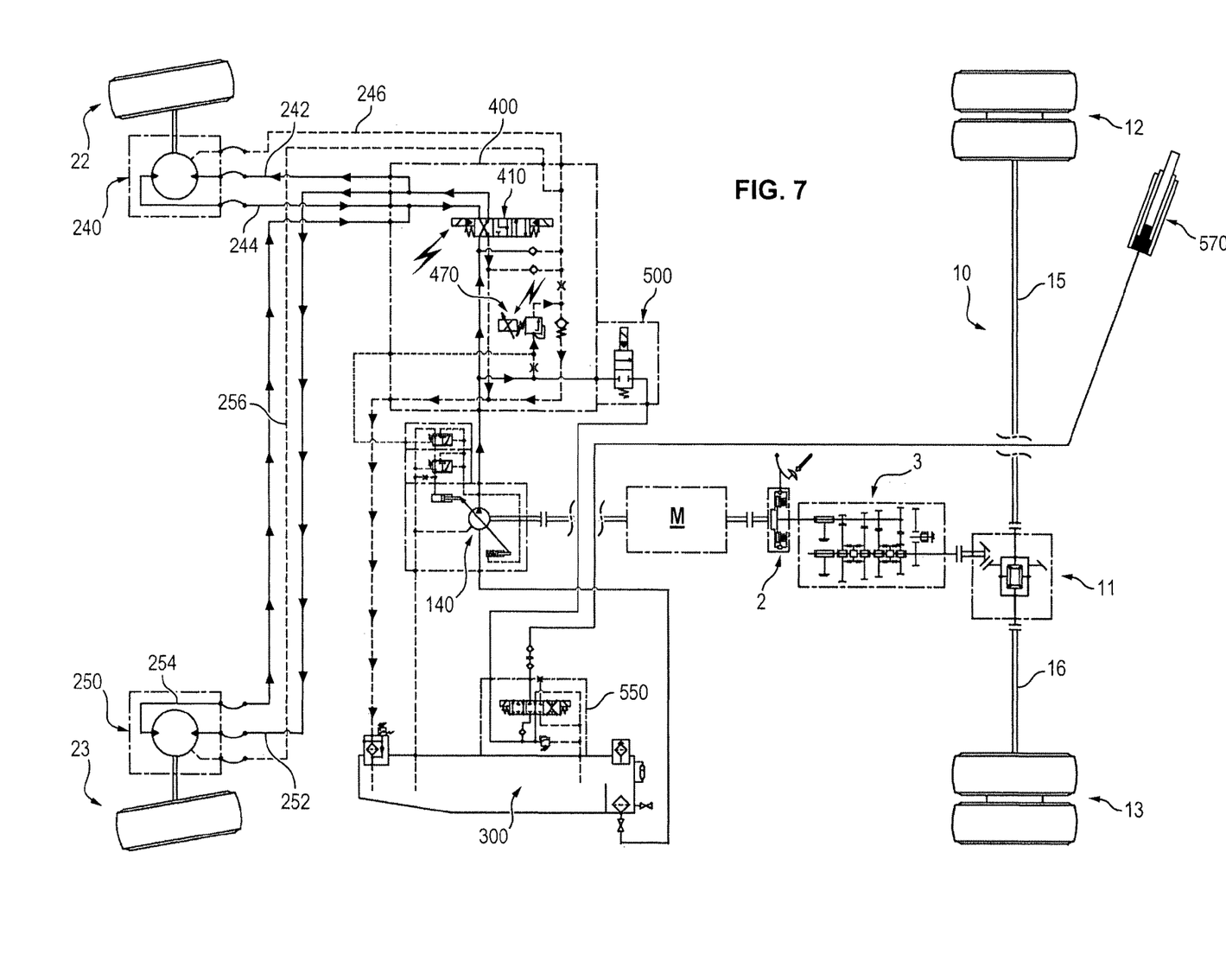
FIG. 7 shows the configuration of the system conforming to the present invention in an assistance mode at a predefined pressure.

By operating the calibration of the electric proportional pressure limiter 470, the operator increases the calibration value of the setting signal applied to the line 145 to control the main pump 140. The main pump 140 thus settles into a displacement when the pressure of the pump is equal to the pressure required.

The assistance is maintained as long as the pump 140 is capable of providing flow rate.

The behavior of the assistance is identical in the reverse drive mode, by commutation of the distributor 410 and a simple reversal of the direction of the connection between the inlets and outlets of the distributor 410 to now connect the line 244, 254 of the motors to the discharge line 142 of the main pump and the lines 242, 252 of the motors to the drain line 143.

Figure 8:
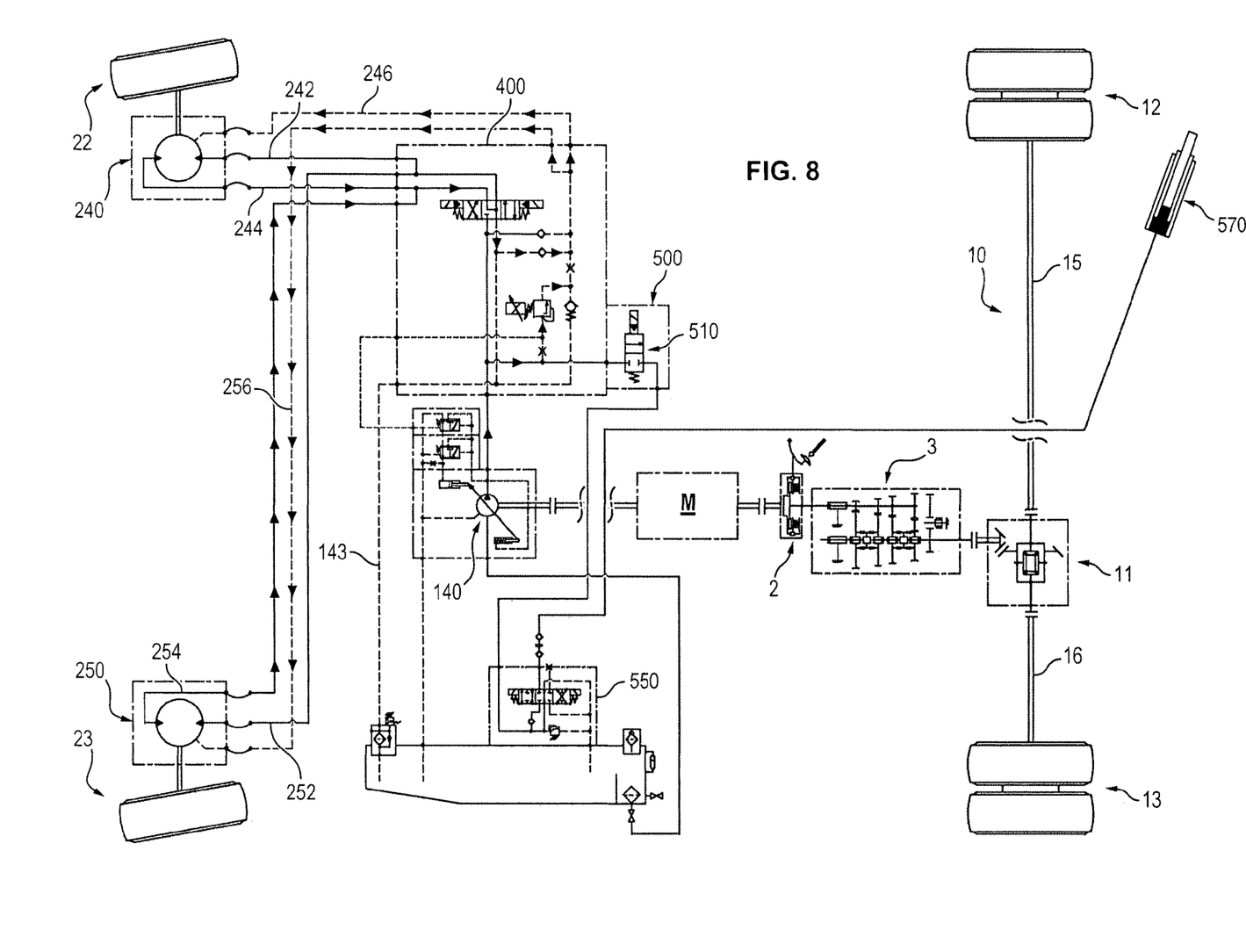
FIG. 8 shows the configuration of the system conforming to the present invention in the front motor declutching mode.

The declutching of the front motors 240, 250 is carried out as illustrated in FIG. 8. To leave the assistance mode, it is necessary first of all to de-calibrate the system by cutting off the control of the pressure limiter 470, then putting the distributor 410 forming a forward, reverse drive selector into the neutral position as illustrated in FIG. 8.

The discharge branches of the motors 240, 250 are then again drained toward the reservoir 300 by the drain line 143. The recharge valve 430 of the casings allows compensation for the missing volume of oil due to the retraction of the pistons into their bores.

Figure 9:
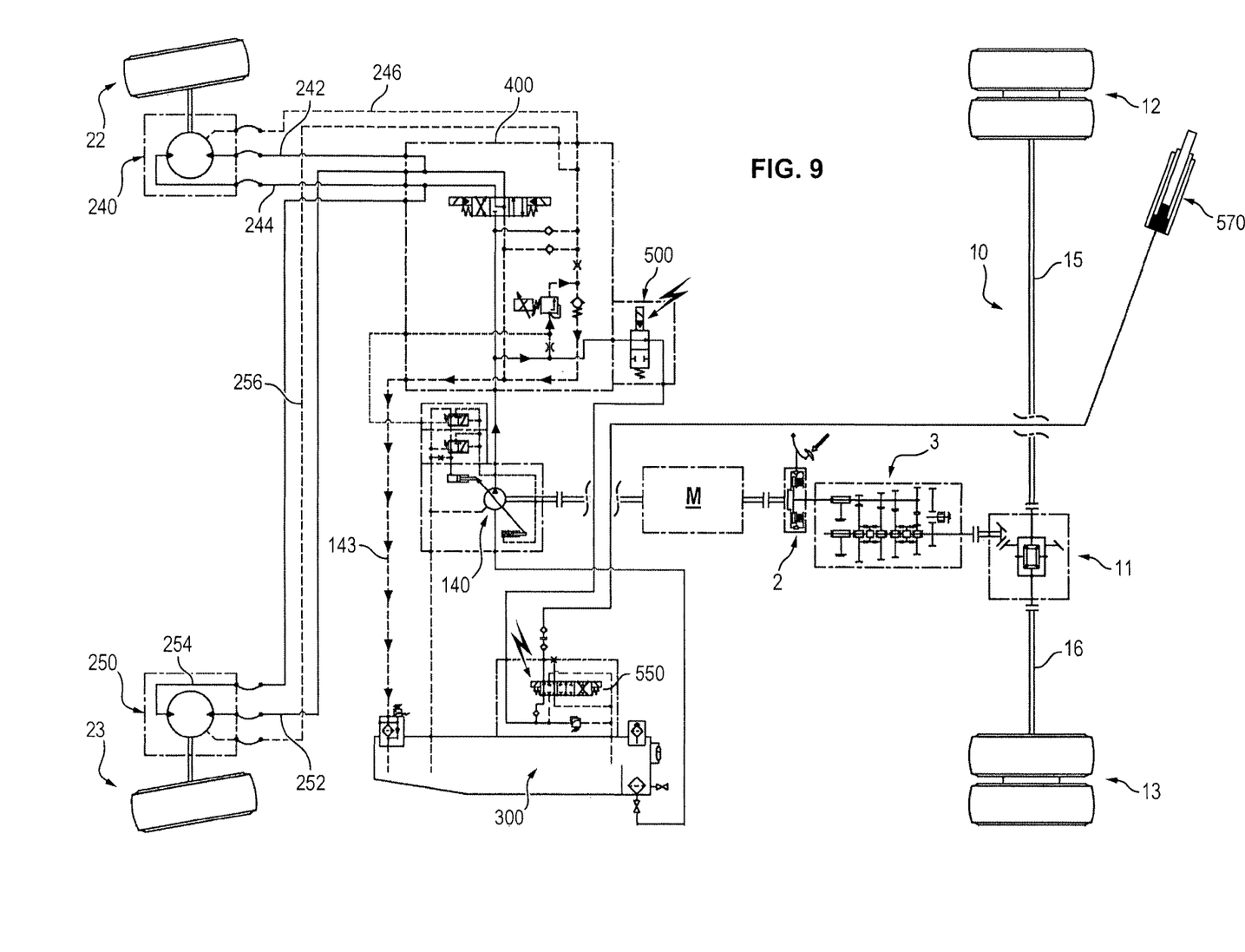
FIG. 9 shows the configuration of the system conforming to the invention in the lifting selection mode.

The selection of a lifting mode is illustrated in FIG. 9. The use of the lifting mode is accomplished when the assistance 410 is in the neutral position.

First of all, the lifting valve 550 is controlled, followed by control of the isolation valve 500.

The reverse sequence would have the effect of putting the pump 140 into full displacement because it discharges direction into the reservoir 300.

The lifting line 572 which leads from the lifting valve 550 to the actuator 570 is then pressurized to the calibration value of the compensator 470.

Figure 10:
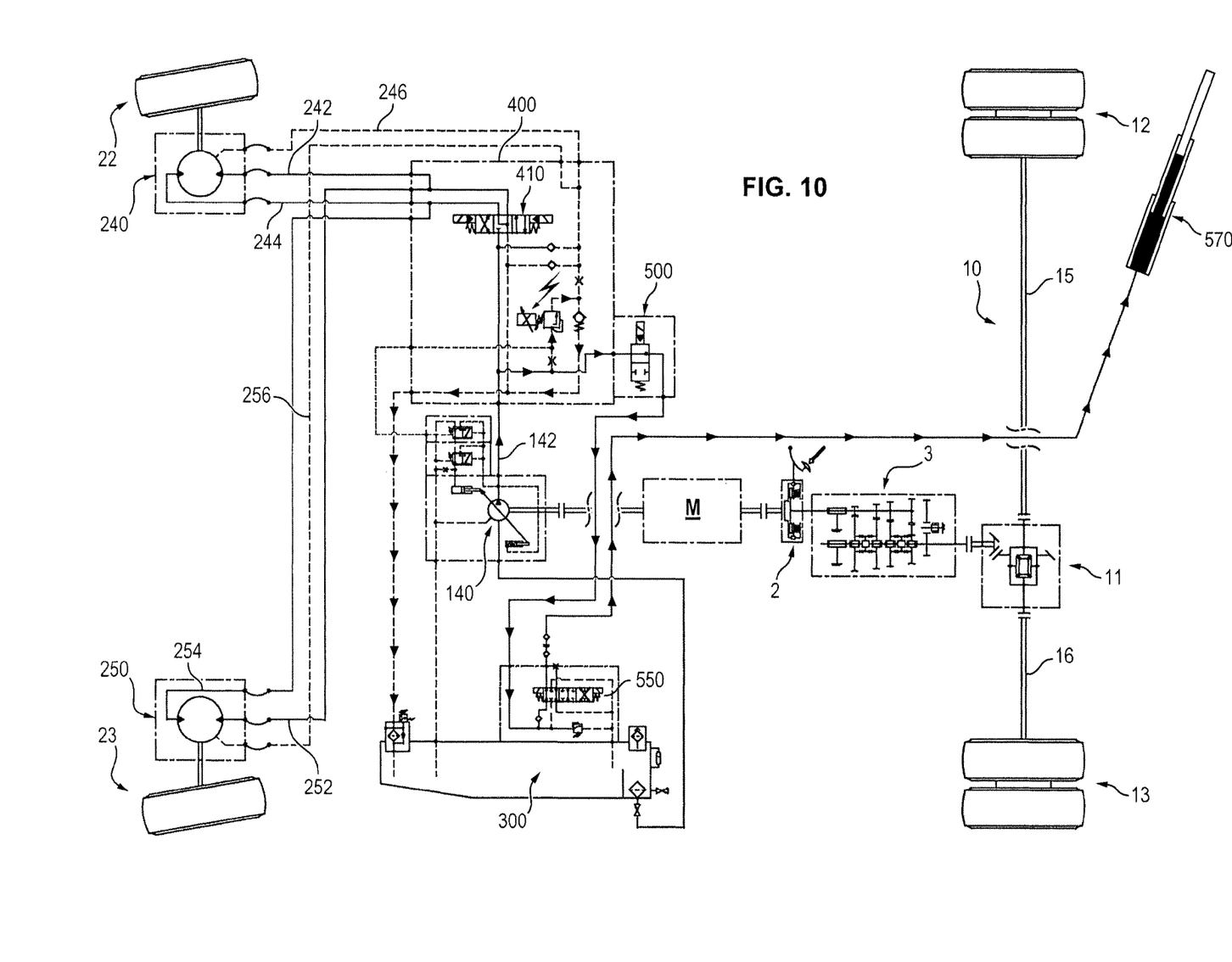
FIG. 10 shows the configuration of the system conforming to the invention in the dump use mode.

The use of a dump actuated by the actuator 570 is illustrated in FIG. 10. The progressive calibration of the electric proportional pressure limiter 470 as shown schematically in FIG. 10 allows the actuator 570 to be operated and therefore to raise the dump.

To maintain the dump in position, it is sufficient to remove control from the proportional limiter.

To lower the dump, it is sufficient to cut the feed of the isolation valve 500 and to reverse the control of the lifting selector 550. The dump then drops under the effect of its own weight.

In the appended figures, the electrically activated components have a label in the form of a lightning-bolt logo.

Previously described is the application of the pump 140 in shunt to an actuator 570 designed for operating a dump. Quite evidently, the invention may be applied to any other application, such as the operation of a crane or other.

A main preferential application of the invention may be the assistance of a truck trailer, to go onto a construction site. It may however also be a truck axle.

The present invention allows excellent control of the assistance with an open circuit.

The invention may be used in particular for traction assistance on bearing wheels of a truck.

In the case of bearing wheels of a trailer, the invention has the advantage of having the traction under the wheels which carry the load, which is very effective.

Other advantages of the invention are the following:
the pump 140 implemented in the scope of the invention is controlled by a variable pressure control; a variable calibration valve 470 allows the torque available for assistance to be varied; in this contact it is possible for example to:
create a first transitional phase in which the pressure is held at a low level, to retract the pistons, then
subsequently regulate the pressure levels of the circuit to adjust the assistance torque. This regulation may be carried out
depending on the speed of the heat engine M (at a low throttle setting the pressure is low to avoid stalling) while, starting from a throttle setting considered sufficient the pressure may be proportional to the throttle setting,
depending on the speed of the vehicle, a priori at full pressure at low speed and reducing this pressure when the speed increases to satisfy a power curve for example, or
depending on the torque available on the heat engine M (it is then possible to share the theoretical availability into two equal parts between the front and the rear for example). To this end, for example, a control on the dashboard allows sending a fixed, smaller pressure setting to the pump in the event of slippage. The driver may thus retain low assistance when he feels that the terrain will not allow all the torque to be transmitted (starting on snow, for example).
an intermediate valve may be used to manage forward drive/reverse drive,
monitoring of the speed of the wheels may be implemented to avoid slippage. The speed may be taken on the assisted wheels, so that if they start to slip, the pressure is reduced, reducing the tendency to slip,
this architecture allows simplifying the installation and reducing the control to something simple and acceptable,
a clutch seems desirable so as not to have the pump 140 constantly turning, and
it is possible to consider a calibration of the valve 470 to zero to allow the displacement to be nullified completely and therefore to eliminate the clutch.

Of course, the present invention is not limited to the particular embodiment which was just described, but rather extends to any variant conforming to its spirit.

The invention claimed is:

1. A hydraulic assistance system for motor vehicles, comprising a primary motor (M) and, a variable displacement hydraulic pump and a first declutchable hydraulic motor, wherein the hydraulic pump and the first hydraulic motor are connected by an open hydraulic circuit running through a reservoir (300), wherein a proportional calibration pressure limiter (470) is between a drain line (143) and a discharge line of the hydraulic pump, with at least one collection restriction (460) interposed between the proportional calibration pressure limiter (470) and the discharge line of the hydraulic pump (140), a set pressure collected between the pressure limiter (470) and the collection restriction (460) controls the displacement of the hydraulic pump, wherein said system comprises a pressurization valve (440) for controlling the pressure in a casing of the first hydraulic motor in a freewheel mode interposed between a drain line (246, 256) originating from the casing of the first hydraulic motor and the reservoir (300) and a restriction (450) positioned in series with the pressurization valve (440) to allow a pressure increase in the casing of the first hydraulic motor.

2. The system according to claim 1, comprises—two actuators (C, D) which act on an oscillating cam plate to regulate the inclination of the plate and, in so doing, the displacement of the hydraulic pump, one of the actuators (D) being fed by a pressure at the discharge line of the hydraulic pump (140), and
    a control module (A, B) which feeds the other actuator (C), according to the set pressure collected between the pressure limiter (470) and the collection nozzle (460).

3. The system according to claim 2, wherein the control module (A, B) comprises a distributor (A) forming a zero-displacement spool suitable for alternately applying a reservoir pressure to said other actuator (C) when a pump outlet pressure is less than the set pressure and the pump outlet pressure when the pump outlet pressure is greater than the set pressure.

4. The system according to claim 2, wherein the control module (A, B) comprises a pressure limiter (B), calibrated by the pump outlet pressure on one side, and by an opposing spring (601) on the other side and applying the pump outlet pressure on said other actuator (C), when the pump outlet pressure exceeds a maximum value, so as to reduce the displacement of the hydraulic pump (140).

5. The system according to claim 1, wherein a second hydraulic motor is mounted in parallel with the first hydraulic motor, wherein the first and second hydraulic motors are associated with respective wheels (22, 23).

6. The system according to claim 1, comprising a three-position distributor defining a neutral position in which first and second feed lines (242, 252) of the first hydraulic motor are drained to the reservoir and two working positions in which said first and second feed lines (242, 252; 244, 254) of the hydraulic motor are respectively fed by the discharge line of the hydraulic pump while said second and first lines of the hydraulic motor are drained to the reservoir, the two working positions defining forward drive and reverse drive.

7. The system according to claim 1, comprising a check valve (420) interposed between the discharge line of the hydraulic pump and the drain line (143) to allow a casing pressure of the hydraulic motor to be limited to a standby pressure when the first hydraulic motor is declutched.

8. The system according to claim 1, comprising a check valve (430) interposed between the drain line and a case drain line (246, 256) originating from the first hydraulic motor to ensure the casing is fed, when the first hydraulic motor is declutched.

9. The system according to claim 1, wherein the discharge line of the hydraulic pump (140) selectively feeds an accessory.

10. The system according to claim 9, comprising an isolation valve (500) connected to the discharge line of the hydraulic pump (140) in series with a valve (550) for feeding an accessory feed circuit.

11. The system according to claim 9, wherein said accessory is a single-acting actuator.

12. The system according to claim 1, comprising a clutch (2) between the primary motor and the hydraulic pump.

13. A hydraulic assistance control method for motor vehicles implementing a primary motor (M), a variable displacement hydraulic pump and a first declutchable hydraulic motor, wherein the hydraulic pump and the first hydraulic motor are connected by an open circuit running through a reservoir (300), and comprising a step of collecting a set pressure from between a proportional calibration pressure limiter (470) and at least one collection restriction (460), wherein the proportional calibration pressure limiter (470) is between a drain line (143) and a discharge line of the hydraulic pump and the at least one collection restriction (460) is between the proportional calibration pressure limiter (470) and the discharge line of the hydraulic pump (140), wherein the set pressure is used to control the displacement of the hydraulic pump, and a pressurization valve (440) is between the reservoir (300) and a casing drain line (246, 256), connected to a casing of the hydraulic motor, with a restriction (450) in series with the pressurization valve (440), to increase a pressure in the casing of the hydraulic motor.

14. The method according to claim 13, comprising
    creating a first transitional phase in which the pressure in the casing of the hydraulic motor is held at a low level, to clutch the hydraulic motor and
    then regulating a pressure level of the hydraulic pump, to adjust an assistance torque of the hydraulic motor depending on a speed of the primary motor (M) or according to a speed of the vehicle, or according to an available torque of the primary motor.

\* \* \* \* \*